US006889129B2

(12) United States Patent
Suzuki et al.

(10) Patent No.: US 6,889,129 B2
(45) Date of Patent: May 3, 2005

(54) VEHICLE SEAT OCCUPANT CLASSIFYING METHOD AND APPARATUS BASED ON A SUPPORT VECTOR MACHINE

(75) Inventors: Tomoji Suzuki, Nagoya (JP); Shinichi Tamura, Tajimi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/444,063

(22) Filed: May 23, 2003

(65) Prior Publication Data

US 2003/0218321 A1 Nov. 27, 2003

(30) Foreign Application Priority Data

May 24, 2002 (JP) ........................................ 2002-150260

(51) Int. Cl.[7] .............................................. B60R 21/32
(52) U.S. Cl. .......................... 701/45; 701/46; 180/273; 280/728.1
(58) Field of Search ..................... 701/45, 46; 180/273; 280/735, 728.1; 73/35.17; 340/667

(56) References Cited

U.S. PATENT DOCUMENTS

| 5,732,375 | A | | 3/1998 | Cashler | ........................ | 701/45 |
| 6,104,100 | A | * | 8/2000 | Neuman | ..................... | 307/10.1 |
| 6,327,221 | B1 | * | 12/2001 | Gualtieri | ...................... | 367/138 |
| 6,728,616 | B1 | * | 4/2004 | Tabe | ............................ | 701/45 |

FOREIGN PATENT DOCUMENTS

| EP | 0891898 | 1/1999 |
| JP | 2001-33324 | 2/2001 |
| JP | 2001-201412 | 7/2001 |
| WO | WO 99/38731 | 8/1999 |

OTHER PUBLICATIONS

"Introduction to Support Vector Learning"; pp., 1–15.
"A Unifying Information –theoretic Framework for Independent Component Analysis" by Te–Won Lee et al.: International journal of computers and mathematics with applications;1999; pp., 1–23.
"Speech Feature Extraction Using Independent Componenet Analysis" by Jong–Hwan Lee et al.; pp. 1–4.

* cited by examiner

Primary Examiner—Thomas G. Black
Assistant Examiner—Arthur D. Donnelly
(74) Attorney, Agent, or Firm—Posz Law Group, PLC

(57) ABSTRACT

A seat occupant in a vehicle is classified into one of first and second categories by using a support vector machine (SVM). Sensor signals are obtained from seat sensors to form a sensor signal vector. By using the sensor signal vector, a value of a two-value decision function known as SVM is calculated. The seat occupant is decided to be of one of the first and second categories associated with the value. The two-value decision function can be generated through support vector learning by using a set of training vectors obtained from the seat sensors. An airbag system using an inventive seat occupant classifying apparatus is also disclosed.

44 Claims, 5 Drawing Sheets

VEHICLE SEAT OCCUPANT CLASSIFYING METHOD AND APPARATUS BASED ON A SUPPORT VECTOR MACHINE

BACKGROUND OF THE INVENTION

1. Field of the Invention

The invention generally relates to a supplemental inflatable restraint (SIR) system (or a so-called airbag system) for a vehicle and, more particularly, to a method and apparatus for use in the SIR system and for non-invasively classifying an occupant of a vehicle seat.

2. Description of the Prior Art

Various methods and apparatuses for use in such a SIR system and for classifying an occupant of a vehicle seat have been proposed so for.

For example, PCT (Patent Cooperation Treaty) patent WO99/38731 discloses "Evaluation method for a seat occupancy sensor". The method comprises the steps of calculating an instantaneous occupancy profile with the use of measured values; comparing the qualities of the instantaneous occupancy profile with stored quality criteria; recording the instantaneous occupancy profile in a buffer storage if the instantaneous occupancy profile happens to superior in quality to the previous occupancy profiles; calculating an averaged occupancy profile by using the stored parameters; and classifying the seat occupancy with the established occupancy profile.

European patent EP0891898A1 discloses "Method and apparatus for recording various parameters of a person seat on a support". The method involves determining the contact surface engaged on the underlay and determining the different parameters on the basis of the engaged contact surface, while taking account of the statistical correlation functions. The determining of the engaged contact surface includes the determination of the extension of the contact surface and the parameters (including weight or size class of the person) derived from this and the determination of the position of the engaged contact surface related to the underlay.

U.S. Pat. No. 5,732,375 discloses "Method of inhibiting or allowing airbag deployment". The method determines whether the infant seat faces forward or rearward. The sensor load forces and the pattern of loading can identify an infant seat and determine its orientation. Local areas are checked to detect child occupants. Fuzzy logic is used to determine loading and to recognize patterns.

Japanese unexamined patent publication Nos. 2001-33324 and 2001-201412 assigned to the assignee of this invention disclose "Apparatus for determining occupant sitting in vehicle seat" and "Seating passenger number determining device of vehicle seat", respectively. The former apparatus first classifies a vehicle seat occupant into two categories of a person and an infant seat on the basis of the relationship between the variance of the detected weights from seat sensors and the total detected weight and then, if the seat occupant is a person, classifies the person into an adult or a child. The latter device classifies a vehicle seat occupant into an adult, a child and an infant seat on the basis of correlation coefficients indicating the degree of agreement between the plane distribution shape of the detection load of each sensor and the reference load plane distribution shape.

However, the above-mentioned vehicle seat occupant classifying techniques are largely dependent on designer's intuition and experiences and disadvantageously fail to make the most of features contained in the detected values obtained from sensors of a vehicle seat. Also, designing a system according to any conventional vehicle seat occupant classifying technique requires a great deal of labor.

For this reason, what is needed is a vehicle seat occupant classifying technique that enables automated generation of a classifying algorithm and highly accurate classification of an occupant of a vehicle seat.

SUMMARY OF THE INVENTION

According to an aspect of the invention, a method of generating a two-value decision function known as a support vector machine and used for classifying a seat occupant or a state of the seat occupant into one of a first category and a second category in a vehicle having an array of sensors and a controller connected to the sensors for effecting the classification is provided. The method comprises the steps of (a) preparing a set of training input-output data samples, each training input-output data sample comprising a training sensor signal vector whose components are derived from the respective sensors and a class value that indicates the first or second category depending on the seat occupant at a time of obtaining the sensor signal vector; and (b) using the set of training input-output data samples to find parameters for the two-value decision function through support vector learning.

According to another aspect of the invention, a method of classifying a seat occupant or a state of the seat occupant into one of a first category and a second category in a vehicle having an array of sensors and a controller connected to the sensors for embodying the method is provided. The method comprises the steps of (a) obtaining respective sensor signals from the sensors to form a sensor signal vector whose components are the sensor signals; (b) calculating a value of a two-value decision function known as a support vector machine by using the sensor signal vector; and (c) deciding the seat occupant to be of one of the first and second categories associated with the value.

According to further aspect of the invention, an apparatus for classifying a seat occupant or a state of the seat occupant into one of a first category and a second category in a vehicle is provided. The apparatus comprises an array of sensors each providing a sensor signal in response to an applied force; and a controller connected to the sensors. The controller comprises (a) means for obtaining respective sensor signals from the sensors to form a sensor signal vector whose components are the sensor signals; (b) means for calculating a value of a two-value decision function known as a support vector machine by using the sensor signal vector; and (c) means for deciding the seat occupant to be of one of the first and second categories associated with the value.

According to another aspect of the invention, an apparatus for controlling airbag deployment in response to a state of a seat occupant in a vehicle is provided. The apparatus comprises the above-described seat occupant classifying apparatus and a portion, in response to a detection of an imminent crash, for controlling airbag deployment on the basis of the one of the first and second categories.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 1:
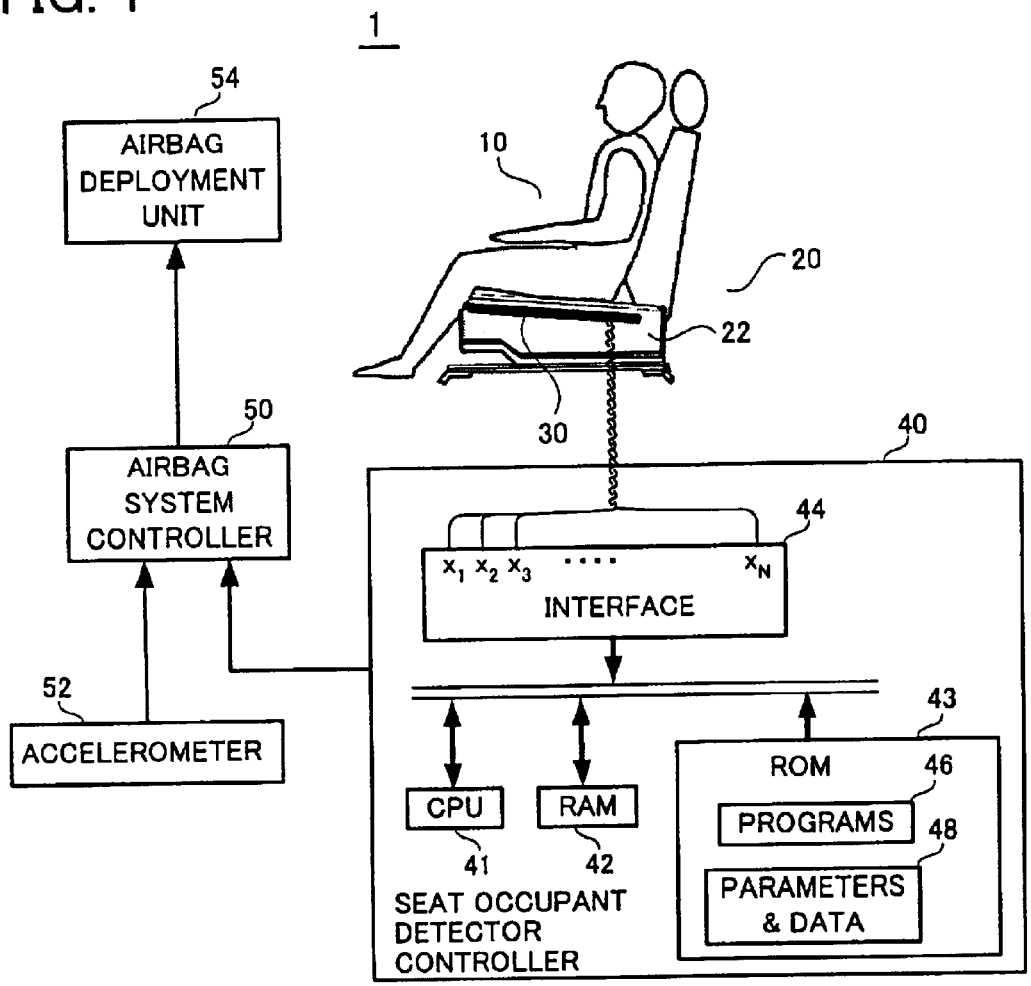
FIG. 1 is a schematic diagram of a SIR or airbag system according to an illustrative embodiment of the invention.

FIG. 1 is a schematic diagram showing an exemplary arrangement of an SIR or airbag system according to an illustrative embodiment of the invention. In FIG. 1, an SIR system 1 includes a vehicle seat 20, on which an occupant 10 is being seated. The seat 20 has a bottom cushion 22, in which a seat sensor 30 is embedded in parallel with the surface of the bottom cushion 22. The SIR system 1 further comprises a seat occupant detector controller 40 connected to the seat sensor 30 for classifying the occupant or the state of the occupant into one of basically-two predetermined categories (detailed later); an accelerometer 50 for sensing an imminent crash; an airbag system controller 52 for controlling airbag deployment in response to a signal from the accelerometer 50 and the classification result provided by the seat occupant detector controller 40; and an airbag deployment unit 54 for inflating an airbag (not shown) in response to a command from the airbag system controller 52.

Figure 2:
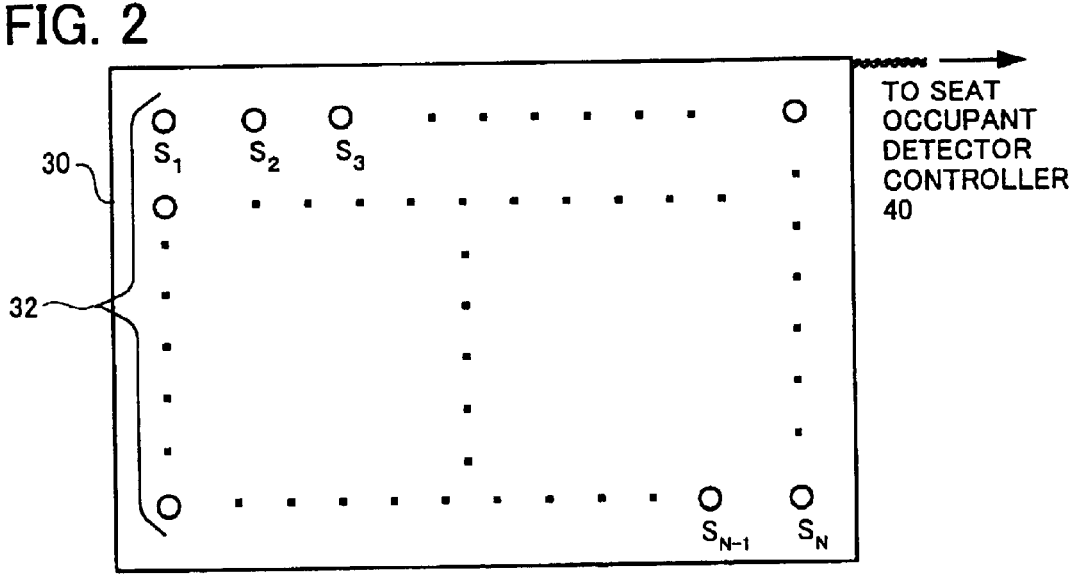
FIG. 2 is a schematic diagram showing an exemplary arrangement of sensor elements of the seat sensor 30 of FIG. 1.

FIG. 2 is a diagram showing an exemplary arrangement of sensor elements disposed in the seat sensor 30. In FIG. 2, N sensor elements denoted by $S_1, S_2, S_3, \ldots, S_{N-1}, S_N$ are so disposed as to form a matrix. However, the N sensor elements may be arranged in any way or in any distribution shape.

The seat occupant detector controller 40, which may be any suitable microcomputer, comprises a CPU (central processing unit) 41; a RAM (random access memory) 42; a ROM (read only memory) for storing various programs 46 such as a seat occupant detecting program and a parameters and data 48 used by the programs 46; and an interface portion 44 having N input ports connected with respective force sensor elements $S_1, S_2, S_3, \ldots, S_{N-1}, S_N$ (32) of the seat sensor 30 to receive N sensor signals $x_1, x_2, x_3, \ldots, x_{N-1}, x_N$ from the respective sensor elements $S_1, S_2, S_3, \ldots, S_{N-1}, S_N$.

According to the principles of the invention, the seat occupant detector controller 40 or CPU 41 classifies the seat occupant 10 into one of predetermined categories "adult" and "child" (in this case, the category "child" includes a child and an infant seat) on the basis of the received sensor signals $x_1, x_2, x_3, \ldots, x_{N-1}, x_N$ by using a decision function known as a Support Vector Machine (SVM) and having the following form:

$$F(x) = \text{sign}\left(\sum_{i \in S} \alpha_i t_i K(x, x_i) - h\right). \tag{1}$$

In the above equation, sign(A) is a sign function that is equal to 1 for A>0 and to −1 for A≦0; x is a sensor signal vector the elements of which are the N sensor signals $x_1, x_2, x_3, \ldots, x_{N-1}, x_N$ received from the respective sensor elements $S_1, S_2, S_3, \ldots, S_{N-1}, S_N$ of the seat sensor 30; vectors $\{x_i | i \in S\}$ are the support vectors (detailed later) that have been selected from a training vector set of a large number of sensor signal vectors measured as training samples in the design or training stage of the seat occupant detector controller 40 and that constitute a support vector set; $t_i$ is a teacher signal or class label, for a support vector $x_i$, that can take a value of 1 or −1 depending on whether the seat occupant is an adult or a child; $\alpha_i$ and h are parameters determined in the training stage as detailed later; and $K(x, x_i)$ is a kernel.

A pair of a support vector $x_i$ and its corresponding teacher signal or class label $t_i$ is hereinafter denoted by $(x_i, t_i)$ and referred to as "input-output training data".

There are some well-known kernels; for example, the polynomial kernel $$K(x, y) = (x^\tau y + 1)^p; \tag{2}$$

the Gaussian Kernel $$K(x, y) = \exp\left(-\frac{\|x - y\|^2}{2\sigma^2}\right); \text{ and} \tag{3}$$

a sigmoid kernel $$K(x, y) = \tan(ax^\tau y - b), \tag{4}$$

where $x^\tau$ is a transposed matrix (vector in this case) of x.

Support vector (SV) machines are one of learning models that exhibit the best pattern recognition performance among the known techniques. The SV machines are learning schemes for constructing an identifier (or classifier) for basically identifying or classifying two classes. Classification into more than two classes can be achieved through the combination of a plurality of support vector machines. For further details of SV machines, refer to B. Scholkopf, C. J. C. Burges, and A. J. Smola; "Introduction to Support Vector Learning", 1998, pp. 1–15, MIT Press.

In order to enable the classification based on the decision function (1) in practical operation of the SIR system 1 or the seat occupant detector (30 and 40), it is necessary to find parameters $\{\alpha_i | i \in S\}$, input-output training data $\{(x_i, t_i) | i \in S\}$, and the parameter h in a design stage of the seat occupant detector controller 40. Here, S is a set of subscripts of the support vectors.

Basic Embodiment

Figure 3:
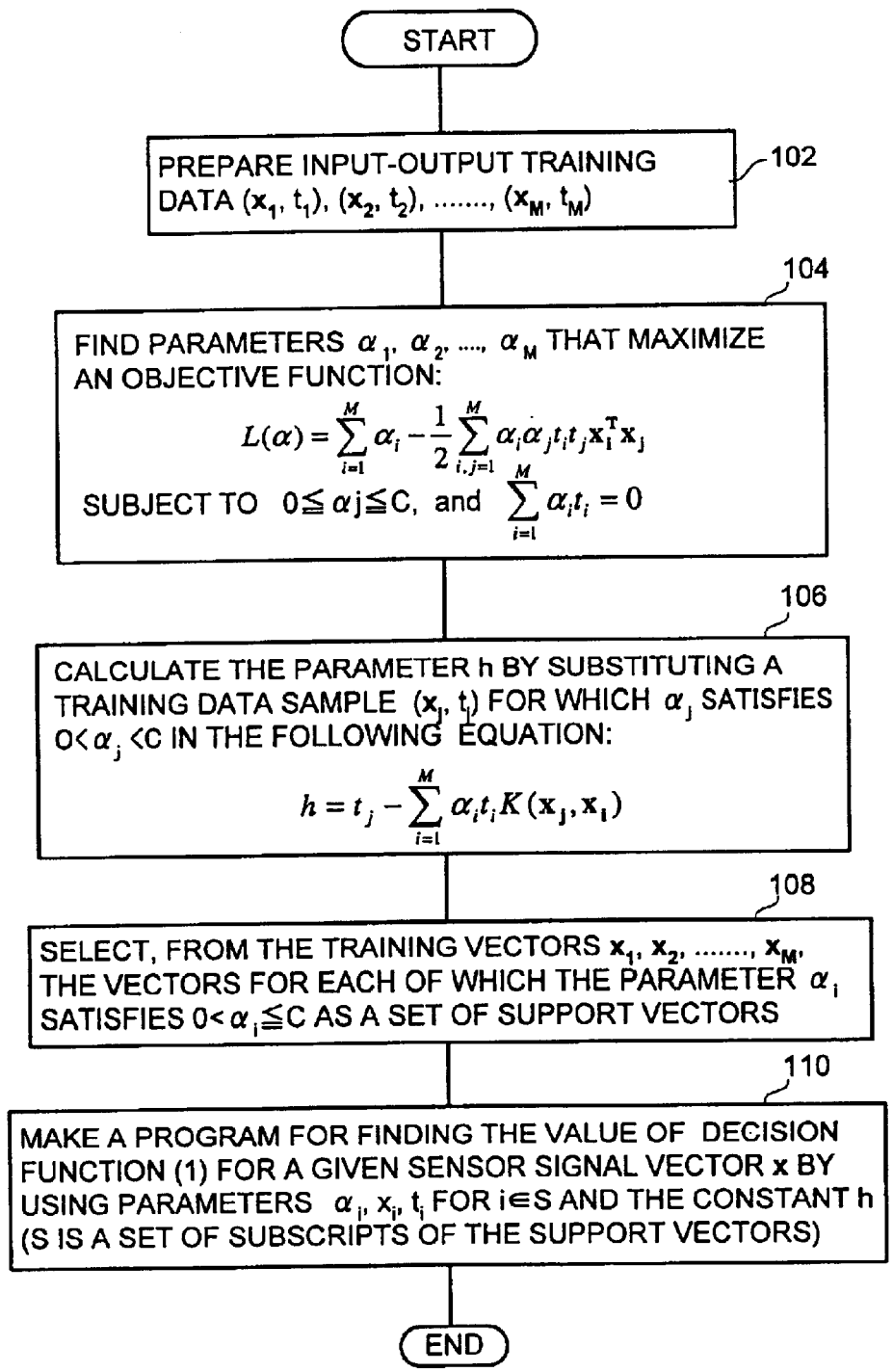
FIG. 3 is a flowchart showing a support vector (SV) learning procedure of creating a program for calculating the decision function (1) in accordance with an illustrative basic embodiment of the invention.

FIG. 3 is a flowchart showing a support vector (SV) learning procedure of creating a program for calculating the decision function (1) in accordance with an illustrative basic embodiment of the invention. In FIG. 3, in step 102 the designer of the seat occupant detector controller 40 first prepares input-output training data samples $(x_1, t_1), (x_2, t_2),$ $(x_3, t_3), \ldots, (x_M, t_M)$ by obtaining M training sensor signal vectors through experiment and attaching to each training vector $x_j$ (j=1, 2, 3, ..., M) a class label that takes a value 1 or −1 depending on whether the seat occupant is an adult or a child when the sensor signals that constitute the training vector $x_j$ are measured. In step 104, the designer finds parameters $\alpha_1, \alpha_2, \ldots, \alpha_M$ that maximize an objective function:

$$L(\alpha) = \sum_{i=j}^{M} \alpha_i - \frac{1}{2} \sum_{i,j=1}^{M} \alpha_i \alpha_j t_i t_j x_i^T x_j, \quad (5)$$

subject to $$0 \leq \alpha_j \leq C (j=1, 2, \ldots, M), \text{ and} \quad (6)$$

$$\sum_{i=1}^{M} \alpha_i t_i = 0, \quad (7)$$

where C is a constant dependent on the extent to which the constraint (6) is loosened.

In step 106, the parameter h is determined by substituting in the following equation an arbitrary input-output training data sample $(x_j, t_j)$ for which the parameter $\alpha_j$ satisfies $0 < \alpha_j < C$.

$$h = t_j - \sum_{i=1}^{M} \alpha_i t_i K(x_j, x_i) \quad (8)$$

In step 108, from the training vectors $x_1, x_2, x_3, \ldots, x_M$, the vectors for each of which the parameter $\alpha_j$ satisfies $0 < \alpha_j \leq C$: i.e., $\{x_i | 0 < \alpha_i \leq C\}$ are selected as "the support vectors". The vectors for which $0 < \alpha_i < C$ are support vectors that exist on either of the two separating hyperplanes. The vectors for which $\alpha_i = C$ are support vectors that exist in the opposite side of either of the two separating hyperplanes. Denoting a set of the support vectors by S, we can write $\{x_i | i \in S\}$ and S is a subset of the training vectors $\{x_1, x_2, x_3, \ldots, x_M\}$.

In step 110, by using parameters $\alpha_i, x_i, t_i$ for $i \in S$ and h, the designer makes a program for calculating the value of the decision function (1) for a given sensor signal vector $x = (w_1, x_2, \ldots, x_N)$. Then, the designer can makes a seat occupant classifying program by using the decision function (1) value calculating program.

Practical Operation of Seat Occupant Detector (30 & 40)

Figure 4:
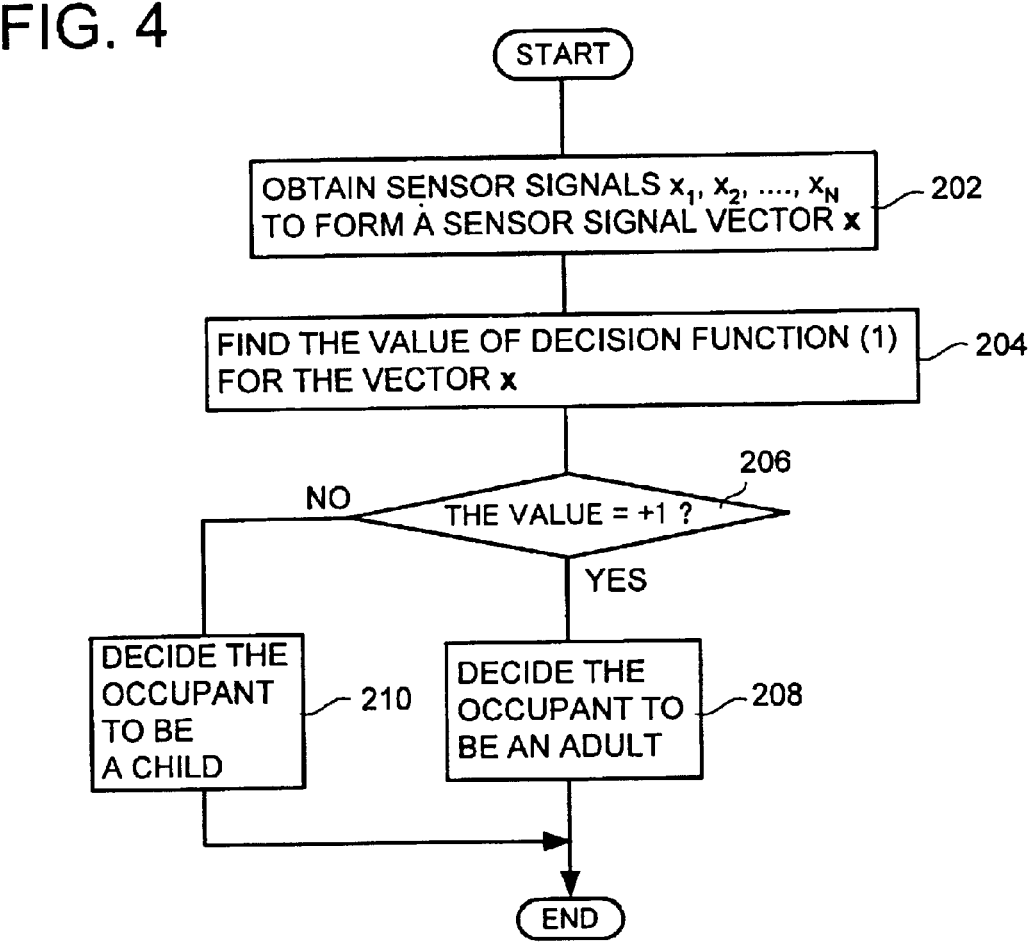
FIG. 4 is a flowchart showing a seat occupant detecting operation executed by CPU 41 under a seat occupant detecting (or classifying) program in accordance with the illustrative basic embodiment of the invention.

FIG. 4 is a flowchart showing a seat occupant detecting operation executed by CPU 41 under the seat occupant detecting (or classifying) program in accordance with the illustrative basic embodiment of the invention. In FIG. 4, CPU 41 inputs sensor signals $x_1, x_2, \ldots, x_N$ output from the respective sensor elements $S_1, S_2, \ldots, S_N$ of the seat sensor 30 and forms the sensor signal vector $x = (x_1, x_2, \ldots, x_N)$ in step 202. Then, CPU 41 finds the value of the decision function (1) for the sensor signal vector x in step 204. In decision step 204, CPU 41 makes a test to see if the found value is equal to +1. If so, then CPU 41 decides the seat occupant to be an adult in step 208. Otherwise, CPU 41 decides the seat occupant to be a child in step 210, after executing step 208 or 210, CPU 41 ends the operation.

As described above, a vehicle seat occupant detector (30+40) according to the illustrative basic embodiment of the invention is capable of high-accuracy vehicle seat occupant detection with the seat sensor signals. Further, since vehicle seat occupant detector (30+40) utilizes a support vector machine, this enables automated generation of a highly accurate seat occupant classifying algorithm without relaying on trial and error.

The detection or classification result is passed to the airbag system controller 52. If the airbag system controller 5 receives a signal indicative of an imminent crash, the airbag system controller 5 controls airbag deployment on the basis of the classification result. For example, the airbag system controller 5 issues an airbag deployment command to the airbag deployment unit 54 if the classification result indicates an adult class but does not issue the airbag deployment command if the classification result indicates a child class. This enables airbag deployment control adapted to the class of the seat occupant, resulting in the safety of a vehicle being enhanced.

Preferred Embodiment

In the above-described illustrative embodiment, the N sensor signals from the seat sensor 30 are directly applied to the decision function (1). However, considering that the vehicle seat occupant detector is installed in a vehicle, it is preferable to reduce the quantities of calculations and used memory. In this embodiment, the dimension of the SV machine is reduced by using the principal component analysis (PCA) and the independent component analysis (ICA).

The sensor signal $x_1, x_2, \ldots, x_N$ from the seat sensor 30 includes various pieces of information other then those that contribute to the classification of a seat occupant. Sensor signals that do not contribute to the classification can be thought to be noises. In this embodiment, the principal component analysis (PCA) is used to remove such noises. Since each of the eigen values obtained in the PCA represents the variance of data in the direction of the corresponding eigen vector, optimal noise reduction is achieved in terms of the minimum square error by deleting eigen vectors of which respective eigen values are relatively small.

Further, the detection error rate is minimized while unnecessary (or less significant) elements are selected through SVM learning and removed from the vectors obtained as the result of the independent component analysis (ICA) of the vectors obtained as the result of the above-mentioned PCA. For details of the ICA, refer to T-W Lee, M. Girolami, A. J. Bell and T. J. Sejnowski, "A Unifying Information-theoretic Framework for Independent Component Analysis" International journal of computers and mathematics with applications, March 2000, Vol. 31(11), pp. 1–21.

Figure 5:
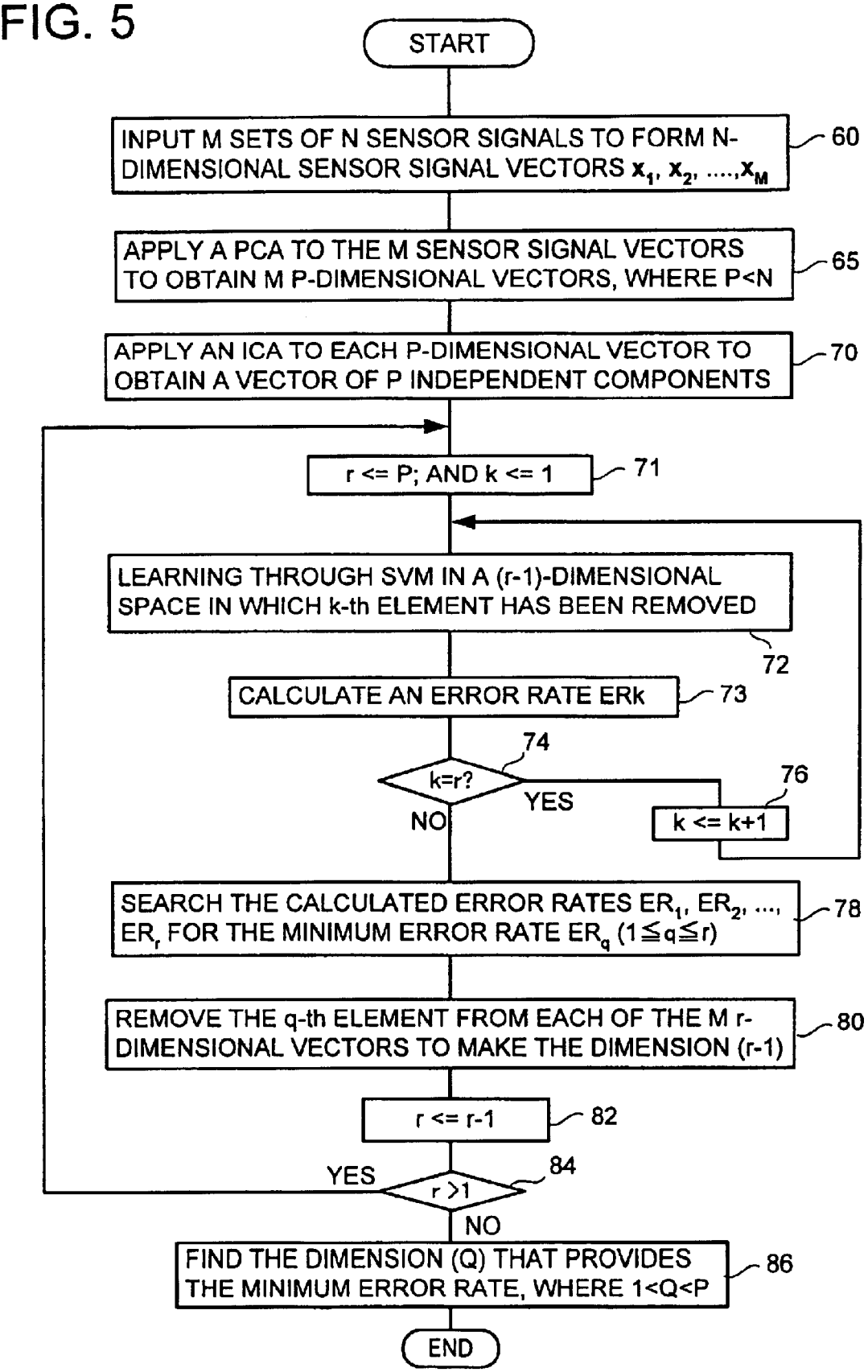
FIG. 5 is a flowchart showing an exemplary procedure of reducing the dimension of vectors in the design stage.

FIG. 5 is a flowchart showing an exemplary procedure of reducing the dimension of vectors in the design stage. In FIG. 5, step 60 obtains M sets of N sensor signals from the seat sensor 30 to form M N-dimensional sensor signal vectors $x_1, x_2, \ldots, x_M$. Step 65 applies a principal component analysis (PCA) to the N-dimensional sensor signal vectors $x_1, x_2, \ldots, x_M$ to obtain M P-dimensional vectors $y_1, y_2, \ldots, y_M$ (P<N), which is to remove noise components.

Then, step 70 applies an independent component analysis (ICA) to each $y_j$ of the obtained M P-dimensional vectors $y_1, y_2, \ldots, y_M$ to obtain a feature vector $z_j$ the component of which are statically independent of each other. Specifically, each of the P-dimensional vectors, $y_j$, can be expressed as a linear combination of mutually independent vectors $s_j$ as follows:

$$y_j = A s_j \quad (9)$$

-continued $$= (a_1, a_2, \ldots, a_P)(s_{j,1}, s_{j,2}, \ldots, s_{j,P})^T$$
$$= a_1 s_{j,1} + a_2 s_{j,2} \ldots + a_P s_{j,P},$$

where A is a P-by-P matrix. As seen from equation (9), the statistically independent features of vector $y_j$ are $s_{j,1}$, $s_{j,2}$, ..., $s_{j,P}$. In ICA, attempts are made to find a linear transformation W of the vector $y_j$ that makes the components of $z_j$ as independent as possible only under the assumption that $s_{j,1}, s_{j,2}, \ldots, s_{j,P}$ are statistically independent of each other in the following equation:

$$z_j = W y_j = W A s_j, \qquad (10)$$

where $z_j$ is an estimate of the sources $s_{j,1}, s_{j,2}, \ldots, s_{j,P}$.

The dimension of the obtained P-independent-component vectors $z_1, z_2, \ldots, z_M$ is reduced in the following. Specifically, step 71 set variables r and k to respective initial values P and 1. Step 72 finds a decision function of R−1 dimension by using M (R−1)-dimensional vectors in which k-th element has been removed according to the SV learning procedure of FIG. 3. Step 73 calculates an error rate ERk. Decision step 74 makes a test to see if k=r. If so, then control is passed to step 76, where the variable k is incremented and the control is returned to step 72. If k is not equal to r in step 74, then step 78 searches the calculated error rates ER1, ER2, ..., ERr to find the minimum error rate ERq ($1 \leq q \leq r$). Step 80 removes the q-th element or component from each of the M r-dimensional vectors to make the dimension (r−1). Step 82 decrements the variable r. Decision step 84 makes a test to see if the variable r exceeds 1. If so, the control is returned to step 71. Otherwise, step 86 finds the dimension Q that provides the minimum error rate, where 1<Q<P.

Then, a program for calculating the value of the decision function for a dimension Q is stored in ROM 43.

Figure 6:
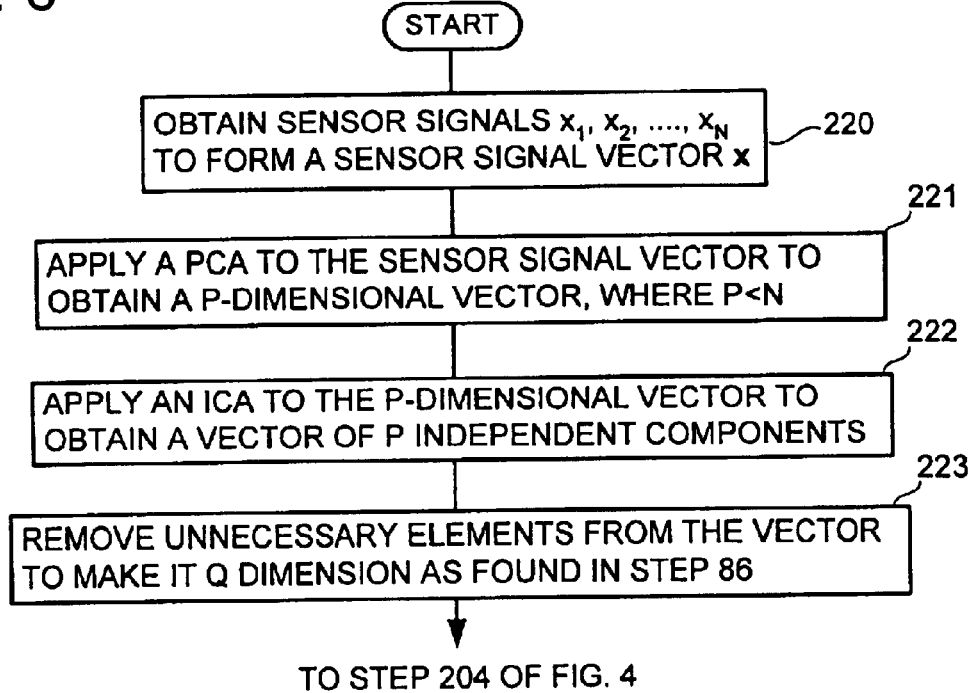
FIG. 6 is a partial flowchart which; when connected to step 204 of FIG. 4, shows a seat occupant detecting operation executed by CPU 41 under a seat occupant detecting (or classifying) program in accordance with a preferred embodiment of the invention.

FIG. 6 is a partial flowchart which, when connected to step 204 of FIG. 4, shows a seat occupant detecting operation executed by CPU 41 under the seat occupant detecting (or classifying) program in accordance with the preferred embodiment of the invention. In FIG. 6, CPU 41 obtains N sensor signals $x_1, x_2, \ldots, x_N$ from the seat sensor 30 to form a sensor signal vector x in step 220. CPU 41 applies a PCA to the sensor signal vector x to obtain a P-dimensional vector y (P<N) in step 221. CPU 41 applies an ICA to the P-dimensional vector y to obtain P-independent-component vector z in step 222. In step 223, CPU 41 removes unnecessary or less significant elements from the P-independent-component vector z to form a Q-dimensional vector such as found in step 86 of FIG. 5. Regarding the formed Q-dimensional vector as the sensor signal vector x, control is passed to step 204 of FIG. 4. Since the subsequent operation has been described in the previous embodiment, the description of the subsequent operation is omitted.

As described above, the preferred embodiment of the invention enables the reduction of the quantity of calculations and the required memory capacity without increasing the error rate. Also, the seat occupant detection is performed by using a vector or data from which noises have been removed by means of the principal component analysis, this enables a raised-accuracy seat occupant detection.

Experiments

We have made some seat occupant detection experiments according to the above-described embodiments.

For the experiments, we have prepared about 6000 input-output data samples including data samples for an adult class, a child class and an infant seat class. About a half of the 6000 data samples were used for SVM training data, and the remaining half of the 6000 data samples were used for test data for evaluation. In the experiments, we set two classes: an adult class and a child class including a child not using an infant seat and an infant set in an infant seat.

TABLE 1

| Used technique | Error rate |
| --- | --- |
| Prior art | 1.2% |
| Basic embodiment | 0.5% |

Table 1 shows error rates for prior art seat occupant detections and seat occupant detections according to the basic embodiment of the invention. Prior art examples was 1.2% in the error rate, while the basic embodiment was 0.5% in the error rate. The basic embodiment is much lower in the error rate than the prior art.

Figure 7:
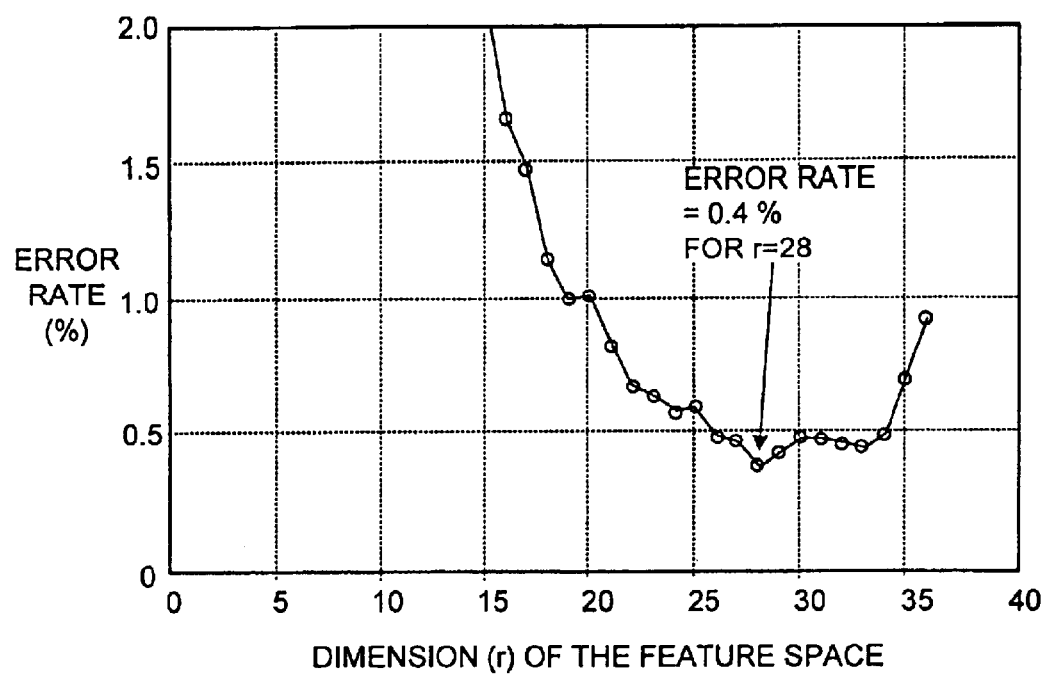
FIG. 7 is a graph showing a relationship between the dimension r of the feature vectors and the error rate for the dimension.

We have also compared the basic embodiment and the preferred embodiment. In this experiment, we used a sensor seat with 74 sensor elements. In the preferred embodiments, the 74 sensor signals were reduced to 36-dimention data through a PCA. AN ICA was applied to the 36-dimention data to extract 36-dimention feature vectors. As shown in the flowchart of FIG. 5, we reduced the dimension of the 36-dimention feature vectors one by one through the SVM learning. FIG. 7 is a graph showing a relationship between the dimension r of the feature vectors and the error rate for the dimension. As shown in FIG. 7, the dimension was reduced one by one through SVM learning, resulting in the maximum error rate of 0.4% at a dimension of 28.

TABLE 2

| Used technique | Dimension of the feature space | Error rate |
| --- | --- | --- |
| Basic embodiment | 74 | 0.5% |
| Preferred embodiment | 28 | 0.4% |

Table 2 shows error rates for the basic embodiment and the preferred embodiment. The error rate for the basic embodiment which used 74-dimension feature space was 0.5%, while the error rate for the preferred embodiment which used 28-dimension feature space was 04%. As seen from Table 2, the preferred embodiment successfully reduced the dimension of the feature space with the error rate being also lowered.

Modifications

In the preferred embodiment, the reduction of the dimension of the feature space is achieved by using both of the PCA and the ICA. However, the reduction of the dimension of the feature space is achieved by using one of the PCA and the ICA.

In the preferred embodiment, the dimension of the independent-component feature vectors obtained by a ICA are reduced by removing less significant components or elements from the independent-component feature vectors. The dimension-reduced feature vectors are used for generation of the SVM. However, the SVM may be generated by using the independent-component feature vectors obtained by a ICA as they are.

Further, in the preferred embodiment, a dimension-reduction-type SVM generation by steps 71 through 86 has been done for the independent-component vectors as a result of an ICA. However, the dimension-reduction-type SVM generation may be done directly for a training set of sensor signal vectors obtained from the sensor elements of the seat sensor 30. In this case, sensor elements corresponding to the removed components can be also removed.

In the above embodiment, a seat occupant has been classified into two categories. However, combining a plurality of SV machines enables the classification into more than two categories such as an adult, a child seated on the seat and an infant put in an infant seat.

The categories of the classification may consist of the degrees of fatigue of a seat occupant (inter alia, a driver): e.g., a slight degree, a medium degree and a heavy degree. It is well known that the pressure pattern of the sensor elements varies according to the degree of fatigue. Accordingly, the degree of fatigue can be estimated by recognizing the pressure pattern. Specifically, the decision function is found based on the sensor signal vectors corresponding to predetermined degrees of fatigue and the class signals associated with the respective predetermined degrees of fatigue. Further, in response to a detection of a degree of fatigue, corresponding audio and/or visual alert may be provided thereby to prompt the driver to take a rest before the degree of fatigue exceeds a certain level, which enables avoidance of a traffic accident.

Alternatively, the categories of the classification may consist of the degrees of awakening of a seat occupant (inter alia, a driver): e.g., a high degree, a medium degree and a low degree. In this case, signals indicative of degrees of awakening may be used as the class or teacher signals. Further, in response to a detection of a degree of awakening, corresponding audio and/or visual alert such as a buzzer sound, an audio guide, etc. may be provided thereby to prompt the driver to take a rest before the degree of awakening lowers too much, which enables further enhancement of the safety during driving.

Many widely different embodiments of the present invention may be constructed without departing from the scope of the present invention. It should be understood that the present invention is not limited to the specific embodiments described in the specification, except as defined in the appended claims.

What is claimed is:

1. A method of classifying a seat occupant or a state of the seat occupant into one of a first category and a second category in a vehicle having an array of sensors and a controller connected to the sensors for embodying the method, the method comprising the steps of:
   (a) obtaining respective sensor signals from said sensors to form a sensor signal vector whose components are said sensor signals;
   (b) calculating a value of a two-value decision function known as a support vector machine by using said sensor signal vector; and
   (c) deciding said seat occupant to be of one of said first and second categories associated with said value.

2. A method as defined in claim 1, wherein said two-value decision function has been generated by using a set of first principal-component vectors obtained by a first principal component analysis of a set of training sensor signal vectors, said first principal-component vectors being smaller in dimension than said training sensor signal vectors, and wherein the method further comprises the step of performing a second principal component analysis of said sensor signal vector to obtain a second principal-component vector, said calculating step using said second principal-component vector instead of said sensor signal vector.

3. A method as defined in claim 1, wherein said two-value decision function has been generated by using first dimension-reduced vectors whose dimension is lower than that of said sensor signal vector, said first dimension-reduced vectors being obtained by the steps of:
   (d) applying an independent component analysis to each of training sensor signal vectors to obtain independent-component vectors;
   (e) removing, from each independent-component vector, one of all components that provides a minimum classification error rate when said two-value decision function is generated by using component-removed versions of said independent-component vectors, each component-removed version being obtained by removing said one component from the corresponding independent-component vector;
   (e2) setting the set of component-removed versions as independent-component vectors newly defined;
   (f) repeating said step (e) and said step (e2) till a dimension of said independent-component vectors becomes 1; and
   (g) selecting one set of component-removed versions providing a minimum classification error rate as said first dimension-reduced vectors,
   and wherein said method further includes the steps of:
   performing a second independent component analysis of said sensor signal vector to obtain a second independent-component vector; and
   forming a second dimension-reduced vector that has the same dimension as that of said first dimension-reduced vectors from said second independent-component vector in the same manner as said first dimension-reduced vectors,
   said calculating step using said second dimension-reduced vector instead of said sensor signal vector.

4. A method as defined in claim 1, wherein said two-value decision function has been generated by using first independent-component vectors obtained by a first independent component analysis of each of training sensor signal vectors, and wherein said method further includes the step of:
   performing a second independent component analysis of said sensor signal vector to obtain a second independent-component vector,
   said calculating step using said second independent-component vector instead of said sensor signal vector.

5. A method as defined in claim 1, wherein said two-value decision function has been generated by using first dimension-reduced vectors whose dimension is lower than that of said sensor signal vector, said first dimension-reduced vectors being obtained by the steps of:
   (d) applying a first principal component analysis to each of training sensor signal vectors to obtain first principal-component vectors, said first principal-component vectors being smaller in dimension than said training sensor signal vectors;
   (e) applying an independent component analysis to each of said first principal-component vectors to obtain independent-component vectors;
   (f) removing, from each independent-component vector, one of all components that provides a minimum classification error rate when said two-value decision function is generated by using said component-removed versions of said independent-component vectors, each component-removed version being obtained by removing said one component from the corresponding independent-component vector;

(f2) setting the set of component-removed versions as independent-component vectors newly defined;

(g) repeating said step (f) and said step (f2) till a dimension of said independent-component vectors becomes 1; and (h) selecting one set of component-removed versions providing a minimum classification error rate as said first dimension-reduced vectors, and wherein said method further includes the steps of:

performing a second principal component analysis of said sensor signal vector to obtain a second principal-component vector;

performing a second independent component analysis of said second principal-component vector to obtain a second independent-component vector; and forming a second dimension-reduced vector, that has the same dimension as that of said first dimension-reduced vectors, from said second independent-component vector in the same manner as said first dimension-reduced vectors, said calculating step using said second dimension-reduced vector instead of said sensor signal vector.

6. A method as defined in claim 1, wherein said second category is classified into a first subcategory and a second subcategory and wherein the method further includes the steps of:

(b2) if said seat occupant is decided to be of said second category, calculating a second value of a second two-value decision function known as a support vector machine and associated with said second category by using said sensor signal vector; and (c2) deciding said seat occupant to be of one of said first and second subcategories associated with said second value.

7. A method as defined in claim 6, wherein said first category is an adult class; said second category is a child class; said child class is divided into a sitting child class for a child sitting on a vehicle seat and an infant seat class for an infant put in an infant seat.

8. A method as defined in claim 1, wherein said first and second categories relate to degrees of fatigue of said seat occupant.

9. A method as defined in claim 6, wherein said first category, said first subcategory and said second subcategory correspond to slight, medium and heavy degrees of fatigue of said seat occupant.

10. A method as defined in claim 1, wherein said first and second categories relate to degrees of awakening of said seat occupant.

11. A method as defined in claim 8, further including the step of, if said seat occupant is decided to be of a higher degree, alerting at least said seat occupant.

12. A method as defined in claim 9, further including the step of, if said seat occupant is decided to be of said heavy degree, alerting at least said seat occupant.

13. A method as defined in claim 10, further including the step of, if said seat occupant is decided to be of a lower degree, alerting at least said seat occupant.

14. A method of generating a two-value decision function known as a support vector machine and used for classifying a seat occupant or a state of the seat occupant into one of a first category and a second category in a vehicle having an array of sensors and a controller connected to the sensors for effecting the classification, the method comprising the steps of:

(a) preparing a set of training input-output data samples, each training input-output data sample comprising a training sensor signal vector whose components are derived from said respective sensors and a class value that indicates said first or second category depending on said seat occupant at a time of obtaining said sensor signal vector; and (b) using said set of training input-output data samples to find parameters for said two-value decision function through support vector learning.

15. A method as defined in claim 14, further including the step of:

applying a principal component analysis to said set of training sensor signal vectors to obtain said set of principal-component vectors, said principal-component vectors being smaller in dimension than said training sensor signal vectors; and said using step (b) using said set of principal-component vectors instead of said set of training input-output data samples.

16. A method as defined in claim 14, further including the step of:

(c) applying an independent component analysis to each of training sensor signal vectors to obtain independent-component vectors;

(d) removing, from each independent-component vector, one of all components that provides a minimum classification error rate when said two-value decision function is generated by using said-one-component-removed versions of said independent-component vectors;

(e) repeating said step (d) till a dimension of said independent-component vectors becomes 1;

(f) selecting one of component-removed versions that provides a minimum classification error rate as dimension-reduced vectors, (g) said using step (b) using said dimension-reduced vectors instead of said set of training input-output data samples.

17. A method as defined in claim 14, further including the step of:

(c) applying an independent component analysis to each of training sensor signal vectors to obtain independent-component vectors;

(d) said using step (b) using said independent-component vectors instead of said set of training input-output data samples.

18. A method as defined in claim 14, further including the step of:

(d) removing, from each training sensor signal vector, one of all components that provides a minimum classification error rate when said two-value decision function is generated by using said-one-component-removed versions of said training sensor signal vectors;

(e) repeating said step (d) till a dimension of said training sensor signal vectors becomes 1;

(f) selecting one of component-removed versions that provides a minimum classification error rate as dimension-reduced vectors, (g) said using step (b) using said dimension-reduced vectors instead of said set of training input-output data samples.

19. A method as defined in claim 18, further including the step of removing sensors such that said array has only sensors that correspond to components of said dimension-reduced vectors.

20. An apparatus for classifying a seat occupant or a state of the seat occupant into one of a first category and a second category in a vehicle, the apparatus comprising:

an array of sensors each providing a sensor signal in response to an applied force; and a controller connected to said sensors, said controller comprising:

(a) means for obtaining respective sensor signals from said sensors to form a sensor signal vector whose components are said sensor signals;

(b) means for calculating a value of a two-value decision function known as a support vector machine by using said sensor signal vector; and (c) means for deciding said seat occupant to be of one of said first and second categories associated with said value.

21. An apparatus as defined in claim 20, further including:

means for performing a principal component analysis of said sensor signal vector to obtain principal-component vector, wherein said calculating means includes means for using said principal-component vector instead of said sensor signal vector.

22. An apparatus as defined in claim 20, further including:

performing an independent component analysis of said sensor signal vector to obtain independent-component vector; and forming a dimension-reduced vector that has the same dimension components as said dimension-reduced vectors, wherein said calculating means includes means for using said dimension-reduced vector instead of said sensor signal vector.

23. An apparatus as defined in claim 20, further including:

means for performing a independent component analysis of said sensor signal vector to obtain independent-component vector, wherein said calculating means includes means for using said independent-component vector instead of said sensor signal vector.

24. An apparatus as defined in claim 20, further including:

means for performing a principal component analysis of said sensor signal vector to obtain principal-component vector;

means for performing an independent component analysis of said principal-component vector to obtain independent-component vector; and means for forming a dimension-reduced vector that has the same dimension components as said dimension reduced vectors, wherein said calculating means includes means for using said second dimension-reduced vector instead of said sensor signal vector.

25. An apparatus as defined in claim 20, wherein said second category is classified into a first subcategory and a second subcategory and wherein the apparatus further includes:

(b2) means, in the event said seat occupant is decided to be of said second category, for calculating a second value of a second two-value decision function known as a support vector machine and associated with said second category by using said sensor signal vector; and (c2) means for deciding said seat occupant to be of one of said first and second subcategories associated with said second value.

26. An apparatus as defined in claim 25, wherein said first category is an adult class; said second category is a child class; said child class is divided into a sitting child class for a child sitting on a vehicle seat and an infant seat class for an infant put in an infant seat.

27. An apparatus as defined in claim 20, wherein said first and second categories relate to degrees of fatigue of said seat occupant.

28. An apparatus as defined in claim 20, wherein said first and second categories relate to degrees of awakening of said seat occupant.

29. An apparatus as defined in claim 27, further including:

means, in the event said seat occupant is decided to be of a higher degree, for alerting at least said seat occupant.

30. An apparatus as defined in claim 28, further including:

means, in the event said seat occupant is decided to be of said lower degree, for alerting at least said seat occupant.

31. An apparatus for controlling airbag deployment in response to a state of a seat occupant in a vehicle, the apparatus comprising:

an array of force sensors each providing a sensor signal in response to an applied force; and a first controller connected to said sensors for classifying said state of said seat occupant into one of a first category and a second category, said first controller comprising:

(a) means for obtaining respective sensor signals from said sensors to form a sensor signal vector whose components are said sensor signals;

(b) means for calculating a value of a two-value decision function known as a support vector machine by using said sensor signal vector;

(c) means for deciding said seat occupant to be of one of said first and second categories associated with said value;

means, in response to a detection of an imminent crash, for controlling airbag deployment on the basis of said one of said first and second categories.

32. A method of classifying a seat occupant or a state of the seat occupant into one of a first category and a second category in a vehicle having an array of sensors and a controller connected to the sensors for embodying the method, the method comprising the steps of:

(a) obtaining respective sensor signals from said sensors to form a sensor signal vector whose components are said sensor signals;

(b) calculating a value of a two-value decision function known as a support vector machine by using said sensor signal vector;

(c) deciding said seat occupant to be of one of said first and second categories associated with said value of said two-value decision function, said first category denoting an adult class, and said second category denoting a child class;

(d) if said seat occupant is decided to be of said second category, calculating a second value of a second two-value decision function known as the support vector machine and associated with said second category by using said sensor signal vector, said second category being classified into a first subcategory denoting a sitting child class for a child seating on a vehicle seat and a second subcategory denoting an infant seat class for an infant put in an infant seat; and (e) deciding said seat occupant to be of one of said sitting child class and said infant seat class associated with said second value of said second two-value decision function.

33. A method as defined in claim 32, wherein said two-value decision function has been generated by using a set of first principal-component vectors obtained by a first principal component analysis of a set of training sensor signal vectors, said first principal-component vectors being smaller in dimension than said training sensor signal vectors, and wherein the method further comprises the step of performing a second principal component analysis of said sensor signal vector to obtain a second principal-component vector, said calculating step using said second principal-component vector instead of said sensor signal vector.

34. A method as defined in claim 32, wherein said two-value decision function has been generated by using first dimension-reduced vectors whose dimension is lower than that of said sensor signal vector, said first dimension-reduced vectors being obtained by the steps of:

(1) applying an independent component analysis to each of training sensor signal vectors to obtain independent-component vectors;

(2) removing, from each independent-component vector, one of all components that provides a minimum classification error rate when said two-value decision function is generated by using component-removed versions of said independent-component vectors, each component-removed version being obtained by removing said one component from the corresponding independent-component vector;

(3) setting the set of component-removed versions as independent-component vectors defined newly;

(4) repeating said steps (2) and (3) until a dimension of said independent-component vectors becomes 1; and (5) selecting one set of component-removed versions providing a minimum classification error rate as said first dimension-reduced vectors, and wherein said method further includes the steps of:

(f) performing a second independent component analysis of said sensor signal vector to obtain a second independent-component vector; and (g) forming a second dimension-reduced vector, having the same dimension as that of said first dimension-reduced vectors, from said second independent-component vector in the same manner as said first dimension-reduced vectors, said calculating step using said second dimension-reduced vector instead of said sensor signal vector.

35. A method as defined in claim 32, wherein said two-value decision function has been generated by using first independent-component vectors obtained by a first independent component analysis of each of training sensor signal vectors, and wherein said method further includes the step of:

(f) performing a second independent component analysis of said sensor signal vector to obtain a second independent-component vector, said calculating step using said second independent-component vector instead of said sensor signal vector.

36. A method as defined in claim 32, wherein said two-value decision function has been generated by using first dimension-reduced vectors whose dimension is lower than that of said sensor signal vector, said first dimension-reduced vectors being obtained by the steps of:

(1) applying a first principal component analysis to each of training sensor signal vectors to obtain first principal-component vectors, said first principal-component vectors being smaller in dimension than said training sensor signal vectors;

(2) applying an independent component analysis to each of said first principal-component vectors to obtain independent-component vectors;

(3) removing, from each independent-component vector, one of all components that provides a minimum classification error rate when said two-value decision function is generated by using component-removed versions of said independent-component vectors, each component-removed version being obtained by removing said one component from the corresponding independent-component vector;

(4) setting the set of component-removed versions as independent-component vectors defined newly;

(5) repeating said steps (3) and (4) until a dimension of said independent-component vectors becomes 1; and (6) selecting one set of component-removed versions providing a minimum classification error rate as said first dimension-reduced vectors, and wherein said method further includes the steps of:

(f) performing a second principal component analysis of said sensor signal vector to obtain a second principal-component vector;

(g) performing a second independent component analysis of said second principal-component vector to obtain a second independent-component vector; and (h) forming a second dimension-reduced vector, having the same dimension as that of said first dimension-reduced vectors, from said second independent-component vector in the same manner as said first dimension-reduced vectors, said calculating step using said second dimension-reduced vector instead of said sensor signal vector.

37. A method of classifying a seat occupant or a state of the seat occupant into one of a first category and a second category in a vehicle having an array of sensors and a controller connected to the sensors for embodying the method, the method comprising the steps of:

(a) obtaining respective sensor signals from said sensors to form a sensor signal vector whose components are said sensor signals;

(b) calculating a value of a two-value decision function known as a support vector machine by using said sensor signal vector; and (c) deciding said seat occupant to be of one of said first and second categories associated with said value of said two-value decision function, wherein said first and second categories relate to degrees of fatigue of said seat occupant.

38. A method as defined in claim 37, further including the step of, if said seat occupant is decided to be of a higher degree of fatigue of said seat occupant in the deciding step, alerting at least said seat occupant.

39. A method as defined in claim 37, further including the steps of:

(d) if said seat occupant is decided to be of said second category, calculating a second value of a second two-value decision function known as the support vector machine and associated with said second category by using said sensor signal vector, said second category being classified into a first subcategory and a second subcategory; and (e) deciding said seat occupant to be one of said first and second subcategories associated with said second value of said second two-value decision function, wherein said first category, said first subcategory and said second subcategory correspond to slight, medium and heavy degrees of fatigue of said seat occupant.

40. A method as defined in claim 39, further including the step of, if said seat occupant is decided to be of said heavy degree of fatigue of said seat occupant in the deciding step (c) or (e), alerting at least said seat occupant.

41. A method of classifying a seat occupant or a state of the seat occupant into one of a first category and a second category in a vehicle having an array of sensors and a controller connected to the sensors for embodying the method, the method comprising the steps of:

(a) obtaining respective sensor signals from said sensors to form a sensor signal vector whose components are said sensor signals;

(b) calculating a value of a two-value decision function known as a support vector machine by using said sensor signal vector; and (c) deciding said seat occupant to be of one of said first and second categories associated with said value of said two-value decision function, wherein said first and second categories relate to degrees of awakening of said seat occupant.

42. A method as defined in claim 41, further including the step of, if said seat occupant is decided to be of a lower degree of awakening of said seat occupant in the deciding step, alerting at least said seat occupant.

43. A method as defined in claim 1, wherein said first category is an adult class, and said second category is a child class.

44. A method as defined in claim 1, wherein said first and second categories relate to degrees of age of said seat occupant.

* * * * *